H. S. SIMPSON.
SEPARATOR SCREEN.
APPLICATION FILED NOV. 13, 1919.
1,431,987.
Patented Oct. 17, 1922.
3 SHEETS—SHEET 1.
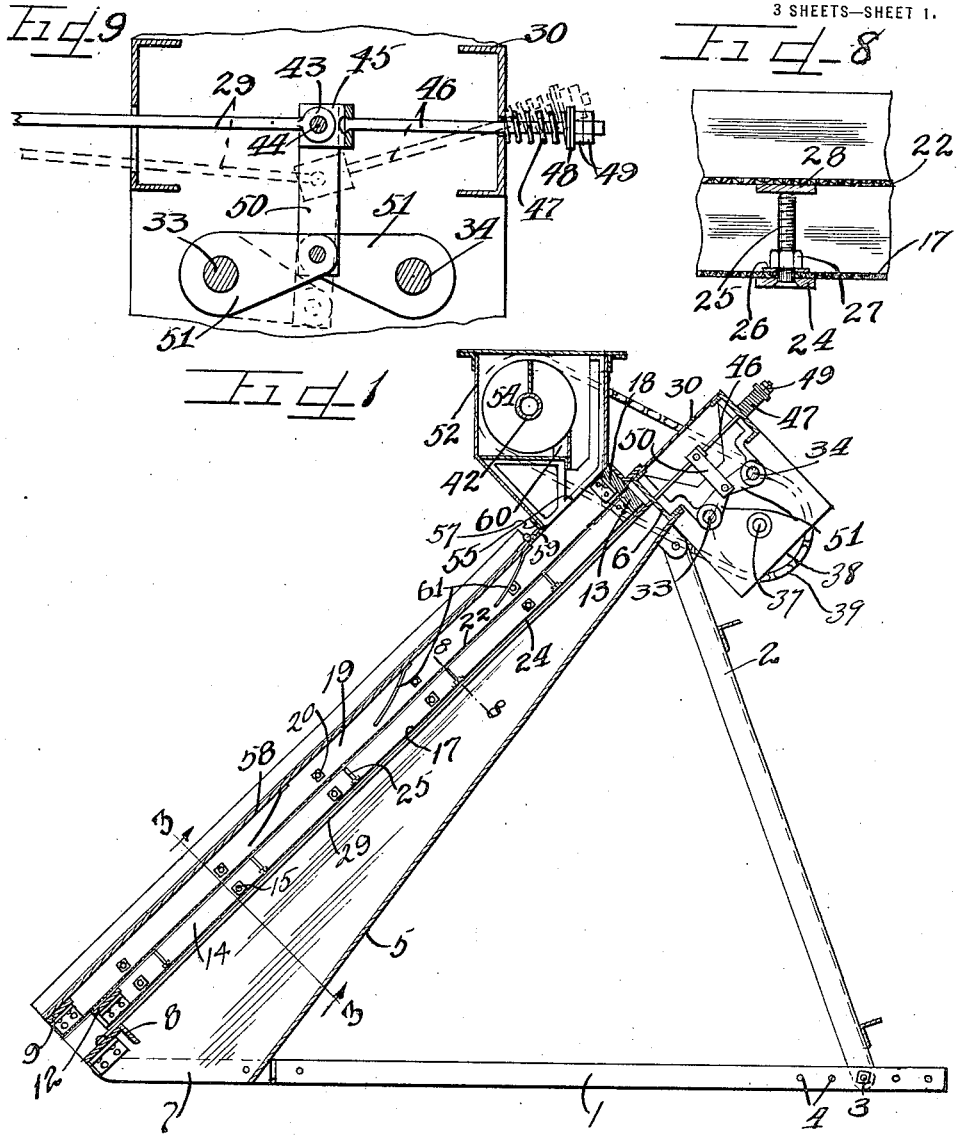

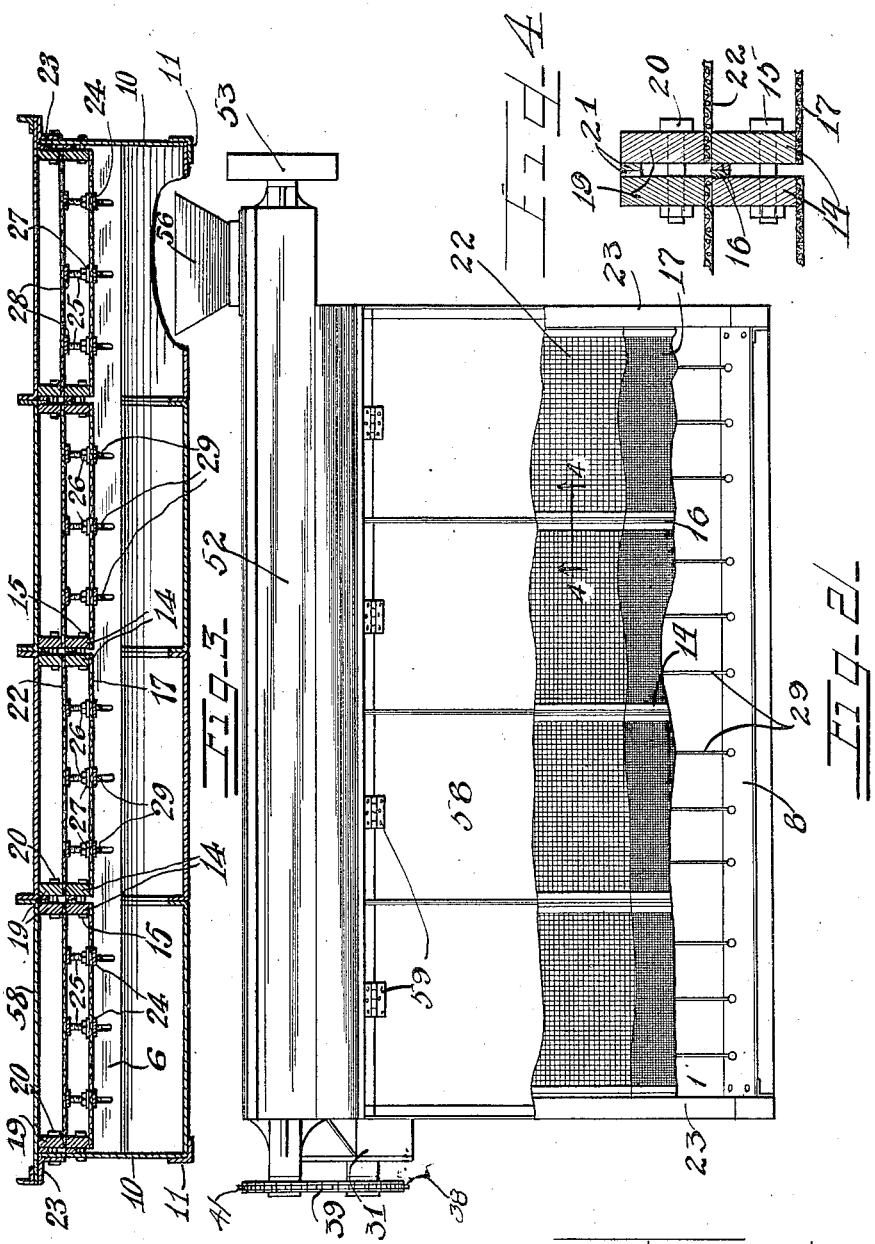

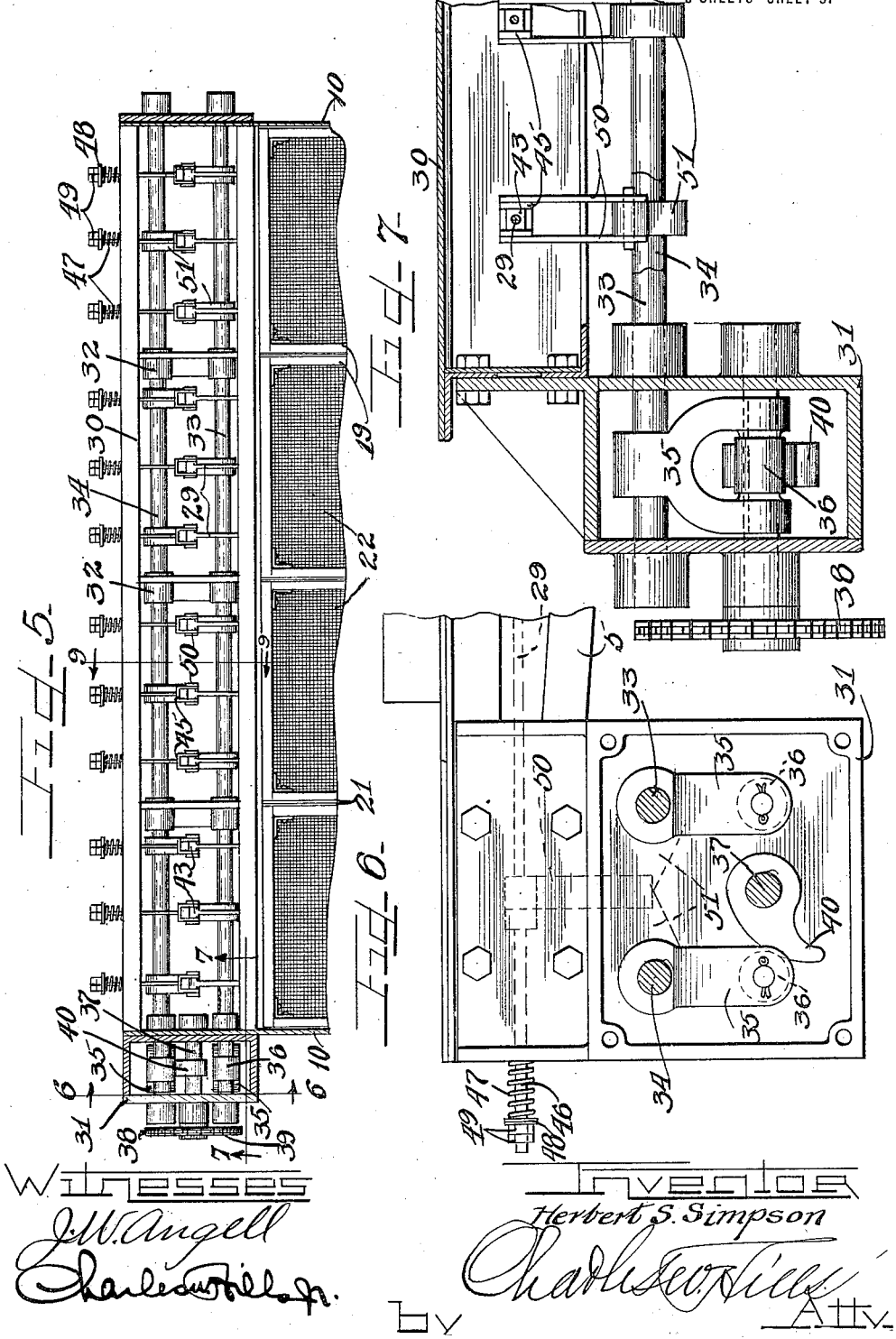

Patented Oct. 17, 1922.

1,431,987

UNITED STATES PATENT OFFICE.

HERBERT S. SIMPSON, OF CHICAGO, ILLINOIS.

SEPARATOR SCREEN.

Application filed November 13, 1919. Serial No. 337,766.

*To all whom it may concern:*

Be it known that I, HERBERT S. SIMPSON, a citizen of the United States, and a resident of the city of Chicago, in the county of Cook and State of Illinois, have invented certain new and useful Improvements in a Separator Screen; and I do hereby declare that the following is a full, clear, and exact description of the same, reference being had to the accompanying drawings, and to the numerals of reference marked thereon, which form a part of this specification.

This invention relates more particularly to an improved type of separator screen wherein a material to be sifted is delivered and distributed by means of a screw feeding mechanism to superposed, inclined sifting screens which are adapted to be vibrated by striking the same to cause the material deposited thereon to be sifted therethrough.

It is an object of this invention to provide a material separator wherein stationary screens are adapted to be agitated from below to cause material on said screens to be sifted therethrough.

Another object of this invention is to provide a separator screen with means for intermittently striking stationary sieve members to cause material deposited thereon to be sifted therethrough.

It is also an object of the invention to construct a material separator wherein a feed mechanism and a vibrating device are adapted to be simultaneously operated by a driving mechanism to supply and cause material to be sifted through inclined screens mounted on a stationary frame.

A further object of the invention is the construction of a material sieve having spring controlled wires adapted to be alternately tensioned and released to intermittently strike a stationary screen to cause material deposited thereon to be sifted therethrough.

It is, furthermore, an object of the invention to provide a separator screen wherein a material is deposited upon the upper portions of superposed inclined screens which are adapted to be vibrated by cam controlled means operated by the driving mechanism for the material feeding device.

It is an important object of this invention to provide a material sifting device of simple and effective construction wherein means disposed below the screens are adapted to strike the same to cause material deposited on the screens to be sifted therethrough.

Other and further important objects of this invention will be apparent from the disclosures in the drawings and specification.

The invention (in a preferred form) is illustrated in the drawings and hereinafter more fully described.

On the drawings:

Figure 1 is a longitudinal section through the separator screen embodying the principles of this invention.

Figure 2 is a front view thereof with parts broken away to show the construction.

Figure 3 is a transverse section taken on line 3—3 of Figure 1.

Figure 4 is a fragmentary detail section taken on line 4—4 of Figure 2.

Figure 5 is a fragmentary sectional view looking downward at the upper end of Figure 1.

Figure 6 is an enlarged detail view taken on line 6—6 of Figure 5.

Figure 7 is an enlarged detail section taken on line 7—7 of Figure 5.

Figure 8 is an enlarged fragmentary detail section taken on line 8—8 of Figure 1.

Figure 9 is an enlarged fragmentary section taken on line 9—9 of Figure 5 showing the operation in dotted lines.

As shown on the drawings:

The reference numeral 1 indicates a base frame having adjustably mounted thereon a rearwardly inclined separator mechanism the upper end of which is braced by means of a brace frame 2 having the upper end pivotally connected to the under side of said mechanism. The lower end of the brace frame 2 is adapted to be removably bolted to the rear end of the base frame 1 by bolts 3 which are adapted to project through any of a plurality of apertures 4 in the base frame, to vary the inclination of the separator mechanism.

The separator mechanism comprises a sectional bottom plate 5 having secured transversely across the upper margin thereof a channel member 6. The lower end of the plate 5 is secured to a small toe frame 7 which is pivotally connected to the front end of the base frame 1. The front of the toe frame 7 is bent upwardly and has rigidly secured thereto a transverse angle bar 8. Also secured to the front upturned end of the toe frame 7 above the angle bar 8 is a transverse bar 9. Side walls 10 are secured to the sides of the toe frame and to the upturned flanges of angle irons 11 secured to the side margins of said bottom plate 5.

Rigidly secured to the inner surfaces of the side walls 10 is a transverse lower bar 12, and a transverse upper bar 13. Secured to said bars 12 and 13 are a plurality of longitudinally disposed inclined bars 14, the intermediate pairs of which are bolted together by bolts 15 and are spaced apart by fillers 16. Secured to the bars 14 are a number of fine screens 17, disposed in the same inclined plane and forming the lower sieve of the device.

A transverse bar 18 is disposed above the upper bar 13 and is secured to the side walls 10. Secured to the bars 9 and 18 are a plurality of parallel inclined bars 19 arranged in pairs. The bars 19 of each pair are bolted together by bolts 20 and separated by fillers 21. An upper inclined sieve is disposed above and parallel to the lower sieve. The upper sieve comprises a number of coarse screen sections 22 disposed in the same inclined plane and secured to bars 19 above the bars 14. Angle bars 23 are secured to the upper margins of the side walls 10.

The lower and upper screens or sieves 17 and 22 are spaced from each other. Disposed against the bottom surface of each of the lower screen sections 17 are a plurality of longitudinal strips 24. Each strip 24 is apertured and is held in place by a screw 25 which projects upwardly therethrough and through the screen section 17. A washer 26 and a nut 27 are engaged on each of the screws 25 above the screen section. The upper end of each screw 25 is disposed to contact a longitudinal strip 28 which is positioned against the under surface of the upper screen section 22 as clearly shown in Figure 8. Each upper screen section 22 is provided with a plurality of said strips 28 positioned above and parallel to the lower screen strips 24. Rigidly secured to the angle bar 8 are the lower ends of a plurality of beater wires 29, one of which is disposed below each of the lower screen strips 24.

Rigidly secured on the upper end of the screen casing is a transversely disposed casing 30 on one end of which is mounted a box 31. A number of bearing members 32 are provided in the casing 30 for supporting two shafts 33 and 34, one end of each of which projects into the box 31. Secured on the projecting portion of each of the shafts 33 and 34 within the box 31 is a depending yoke 35 provided with a roller 36 between the arms thereof. Journalled in the box 31 below and between the shafts 33 and 34 is an operating axle or shaft 37 the outer end of which has a sprocket wheel or gear 38 keyed thereon. A driving chain 39 is trained around said sprocket wheel and around a second sprocket wheel 41, mounted on one end of a shaft 42. A cam 40 is secured on the driving shaft 37 within the box 31 and is adapted, when rotated, to alternately engage the rollers 36 to alternately rock the shafts 33 and 34.

The upper end of each beater wire 29 projects into the casing 30, and has a head 43 secured thereon. The head 43 is apertured and is engaged on a pin 44 supported by the arms of a yoke 45. Each yoke 45 is attached on the inner end of a short wire 46, which wire slidably projects through the rear wall of the casing 30 and has a controlling spring 47 coiled therearound. One end of the spring 47 contacts the casing 30, while the outer end seats against a washer 48 held in place by nuts 49 threaded on the outer end of the wire 46. Also pivotally connected to the end of each pin 44 are the upper ends of a pair of links 50 the lower ends of which are pivotally connected to cranks 51 keyed on the rocker shafts 33 and 34. As clearly shown in Figure 5 the cranks 51 are alternately connected to the shafts 33 and 34.

Mounted across the upper part of the separator frame or casing is a material feed mechanism embracing a box or casing 52 through which the driving shaft 42 projects. A driving pulley 53 is keyed on the extending end of the shaft 42 opposite the sprocket gear 41 and is adapted to have a driving pulley engaged therearound. The driving pulley is connected with any suitable source of power. Formed on the shaft 42 is a feed member 54 for feeding a material into the upper portion of the separator casing through an opening 55 provided for the purpose in said casing 52. A hopper 56 is mounted on the top and at one end of the casing 52 for supplying a material to said feed member 54. A material distributing board 60 is disposed longitudinally in the casing 52 to the rear of the feed member. Rigidly secured across the lower front portion of the casing 52 and to the frame members 23 is an angle member 57 to which a cover or door 58 is pivotally connected by means of hinges 59. The cover 58 closes the separator casing. The lower ends of the various compartments formed in the separator casing are open to permit discharge, into suitable receptacles, of the sifted material.

The operation is as follows:

With the machine assembled as shown and described a material such as sand which is to be graded by sifting is deposited into the open hopper 56 and falls into the casing 52. The machine is driven by means of a belt trained around the pulley 53. Rotation of the pulley causes rotation of the feed member 54, which acts to convey the sand through the casing 52 to be deposited through the openings 55 upon the upper portion of the primary or coarse mesh screen 22. The deflected board 60 in the casing 52 serves to evenly distribute the sand upon the upper portion of the screen 22. Inwardly directed members 61 are secured transversely on the inner surface of the cover 58 to arrest the downward movement of the sand on the inclined upper screen 22.

Rotation of the shaft 42 acts to transmit the drive to the sprocket gear 41 and to the sprocket gear 38 by means of the chain 39. The short shaft 37 is thus rotated, thereby causing rotation of the cam 40, which alternately engages the rollers 36 to alternately swing the yokes 35 away from the shaft 37. When one of the yokes 35 is swung away from the shaft 37, the shaft 33 or 34, as the case may be, is rocked or partially rotated, thereby causing the cranks 51 engaged on said shaft to swing downwardly. The links 50 connected with said cranks are thus pulled downwardly to break the respective wire beaters 29—46 at the pins 44, as shown in Figure 9. The respective wires 46 are accordingly pulled inwardly compressing the springs 47. The respective wires 29 are at the same time relaxed or moved away from the lower screen strips 24. As the cam 40 moves out of engagement with the respective roller 36 and into engagement with the other roller, the stressed springs 47, act automatically to pull the beater wires 29—46 outwardly to tension the same. This tensioning of the wires 29 causes the same to strike against the lower screen strips 24. The lower or fine screen 17 is thus beaten or caused to vibrate. The screw members 25 secured to the strips 24 simultaneously act against the strips 28 of the upper screen and cause vibration thereof.

The wires 29—46 are alternately connected to the shafts 33 and 34 by the cranks 51. It will accordingly be seen that one set of wires is relaxed as the other is tensioned due to the operation of the cam 40 on the rollers 36. The inclined sifting screens 17 and 22 are thus caused to pulsate or vibrate when the machine is in operation. The sand deposited upon the upper portion of the top screen 22 is agitated by the movement of the screen and slides downwardly thereon. The finer particles of the sand sift through the screen 22 and fall upon the lower inclined screen 17 to be sifted thereby. The finest particles of the sand fall through the screen 17 upon the bottom board 5 and are discharged through the lower open end of the separator casing into a suitable receptacle. The coarser sand particles remaining on the screen 17 slide downwardly thereon and find their way out of the lower part of the separator casing. The real coarse parts of the sand slide downwardly on the upper screen 22 and leave the machine through the lower open end thereof. Chutes or other similar devices may be connected to the lower open end of the separator casing to receive the various grades of the sifted sand. The members 61 on the inner surface of the cover 58 serve to retard the downward movement of the sand deposited upon the screen 22.

Any number of inclined screens of different wire mesh may be used within the separator casing for sifting any desired kind of material. The inclination of the separator casing within which the sifting screens are mounted may be varied by removing the bolt or bolts 3 and shifting the bracing frame 2 to permit said bolts to engage any of the openings 4 in the base of the device. The cover 58 is adapted to be lifted to permit cleaning or repairs to be made to the various mechanisms mounted within the separator casing.

I am aware that numerous details of construction may be varied through a wide range without departing from the principles of this invention, and I therefore do not purpose limiting the patent granted otherwise than necessitated by the prior art.

I claim as my invention:

1. A material separator comprising a framework, inclined screens mounted thereon in superposed relation, main wires secured to said framework and disposed below the lowermost screen, auxiliary wires pivotally connected with said main wires, springs thereon contacting the framework and adapted to hold said main wires tensioned to contact the lowermost screen, a pair of shafts mounted on said framework, crank members connected with said main wires and alternately secured on said shafts, and a cam mechanism for alternately rocking said shafts to operate said crank members to release said main wires, said springs adapted to act automatically to again tension said main wires to cause the same to strike the lowermost screen to vibrate the same.

2. A material separator comprising a framework, inclined screens mounted thereon in superposed relation, main wires secured to said framework and disposed below the lowermost screen, auxiliary wires pivotally connected with said main wires, springs thereon contacting the framework and adapted to hold said main wires tensioned to contact the lowermost screen, a pair of shafts mounted on said framework, crank members connected with said main wires and alternately secured on said shaft, a cam mechanism for alternately rocking said shafts to operate said crank members to release said main wires, said springs adapted to act automatically to again tension said main wires to cause the same to strike the lowermost screen to vibrate the same, and means on said lowermost screen to transmit the vibratory motion to the uppermost screen.

3. A material separator comprising connected inclined screens of different mesh, wire mechanisms below said screens, springs for holding said wire mechanisms tensioned, a driving shaft, means for rotating the same, a pair of rocker shafts, crank means for connecting said wire mechanisms alternately to said rocker shafts, a yoke on each of said rocker shafts, a roller carried by each yoke, and a cam on said driving shaft adapted to alternately engage said rollers and swing said yokes to rock said rocker shafts, whereby said crank means act to break the tension of said wire mechanisms, and said springs serve to again automatically tension the wire mechanisms to cause the same to vibrate the screens and sift a material deposited thereon.

4. A separator embracing a screen, main wires positioned therebelow, auxiliary wires connected therewith, springs on said auxiliary wires for holding said main wires and said auxiliary wires tensioned to contact said screen, and means for pulling said wires out of contact with the screen and to permit the springs to cause the same to strike against the screen to vibrate the same.

5. A material separator comprising a lower screen, an upper screen, mechanisms connecting said screens, flexible members disposed beneath said lower screen, means for pulling said flexible members out of contact with the lower screen, and means for automatically snapping said flexible members to cause the same to strike the lower screen to vibrate the same, said mechanisms serving to transmit the vibrations of said lower screen to said upper screen.

6. A screening machine comprising a screen, main wires therebelow, auxiliary wires, members pivotally connecting said wires, springs on said auxiliary wires for tensioning the wires to hold the main wires in contact with the screen, a shaft, links pivotally connected to said members, cranks secured on said shaft and pivotally connected with said links, a yoke secured on said shaft, a roller supported thereby, and a cam adapted to co-act with said roller to cause rocking of the shaft whereby the tension of the wires is released, said springs serving to again tension the wires to cause the same to strike and vibrate the screen.

In testimony whereof I have hereunto subscribed my name in the presence of two subscribing witnesses.

HERBERT S. SIMPSON.

Witnesses:
CHARLES W. HILLS, Jr.,
EARL M. HARDINE.